(12) United States Patent
Ide et al.

(10) Patent No.: US 6,360,059 B1
(45) Date of Patent: Mar. 19, 2002

(54) FOCUS DETECTOR

(75) Inventors: Masataka Ide, Hachioji; Hisashi Goto, Tokyo, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/575,981

(22) Filed: May 23, 2000

(30) Foreign Application Priority Data

May 27, 1999 (JP) .......................................... 11-148239

(51) Int. Cl.⁷ .............................................. G03B 13/36
(52) U.S. Cl. ...................................................... 396/114
(58) Field of Search ................................ 396/114, 113, 396/111; 250/201.6, 201.7, 201.8, 201.2

(56) References Cited

U.S. PATENT DOCUMENTS

| | | | | |
|---|---|---|---|---|
| 4,497,561 A | * | 2/1985 | Suzuki | 396/114 |
| 4,712,901 A | * | 12/1987 | Ohtaka | 396/114 |
| 4,808,808 A | * | 2/1989 | Karasaki et al. | 250/201.2 |
| 4,849,782 A | * | 7/1989 | Koyama et al. | 396/114 |

FOREIGN PATENT DOCUMENTS

| | | |
|---|---|---|
| JP | 10-104502 | 4/1998 |
| JP | 10-136244 | 5/1998 |

* cited by examiner

Primary Examiner—W. B. Perkey
(74) Attorney, Agent, or Firm—Frishauf, Holtz, Goodman, Langer & Chick, P.C.

(57) ABSTRACT

The present invention provides a low-cost focus detector that can carry out a focus detection over a wide field of view and can secure a sufficient light-receiving quantity to have an improved S/N ratio and an improved focus detection precision. A camera has a condenser lens disposed near a predetermined focusing surface of an image pick-up lens. At the rear of the condenser lens, a brightness diaphragm having a pair of apertures is disposed. Further, at the rear of the brightness diaphragm, a telecentric type image re-forming lenses are disposed. Images formed by beam fluxes passed through the image re-forming lenses are received by an image pick-up device that includes photo-electric conversion elements.

23 Claims, 12 Drawing Sheets

FOCUS DETECTOR

CROSS-REFERENCE TO RELATED APPLICATIONS

This application is based upon and claims the benefit of priority from the prior Japanese Patent Application No. 11-148239, filed May 27, 1999, the entire contents of which are incorporated herein by reference.

BACKGROUND OF THE INVENTION

The present invention relates to a focus detector to be used for a camera or the like, and more particularly to a focus detector that is used for an image pick-up device.

There have so far been proposed a large number of focus detectors. Each of these focus detectors is designed to guide an image formed by an image pick-up lens onto a focus detection optical system, split the image into two piece of images, form these images again on photoelectric conversion elements, and detect positional deviations between the two images that have been formed on the photoelectric conversion elements, thereby to detect the focus of the image picked-up object.

For example, Jpn. Pat. Appln. KOKAI Publication No. 10-104502 discloses a focus detector that expands a focus detection area. The focus detector described in this publication uses an exclusive focus-detection area sensor.

According to the technique described in Jpn. Pat. Appln. KOKAI Publication No. 10-104502, however, the exclusive focus-detection area sensor is used, and the cost thereof is increased. Therefore, there is a problem that it is not practicable to mount such an expensive focus detector onto a low-price camera.

Further, as the exclusive area sensor is not mounted with an on-chip micro lens, the aperture is low and the light-receiving quantity is insufficient, with a low S/N ratio.

BRIEF SUMMARY OF THE INVENTION

It is, therefore, an object of the present invention to provide a focus detector that can secure a sufficient light-receiving quantity to have an improved S/N ratio and an improved focus detection precision, with low cost.

It is a first object of the present invention to provide a focus detector for an image pick-up lens, the focus detector comprising:

a condenser lens disposed near a predetermined focusing surface of the image pick-up lens;

a brightness diaphragm disposed at the rear of the condenser lens, and having a pair of apertures;

an image re-forming optical system of a telecentric type disposed at the rear of the brightness diaphragm; and a photoelectric converter including photoelectric conversion elements for receiving an image formed by a beam flux passed through the image re-forming optical system.

It is a second object of the invention to provide a focus detector or a distance-measuring device including a detection optical system that guides a beam flux of an image picked-up object onto at least a pair of brightness diaphragms and an image-forming lens, and forms images on light-receiving surfaces of photoelectric conversion elements disposed at the rear of the image-forming lens, wherein a correction lens for locating an injection pupil for receiving an incident beam onto the light-receiving surface of the photoelectric conversion elements at a substantially infinite distant position, is provided between the image-forming lens and the light-receiving surface of the photoelectric conversion elements.

It is a third object of the invention to provide an automatic focusing camera, comprising:

photoelectric conversion elements;

a detection optical system that includes a pair of brightness diaphragms and a lens disposed at positions along an image-splitting direction, for forming an image of an image picked-up object on the light-receiving surface of the photoelectric conversion elements disposed at the rear of the lens by receiving a beam flux on this surface; and a controller for controlling an automatic focusing of an image based on an output signal of the photoelectric conversion elements, wherein the lens corrects a main beam of a beam flux incident to the light-receiving surface of the photoelectric conversion elements to be perpendicular to the light-receiving surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A and 5B show a structure of an image pick-up lens and a focus detection optical system according to the first embodiment of the present invention.

FIGS. 20A and 20B are diagram for explaining a second embodiment of the present invention.

DETAILED DESCRIPTION OF THE INVENTION

Embodiments of the present invention will be explained below with reference to the drawings.

Figure 1:
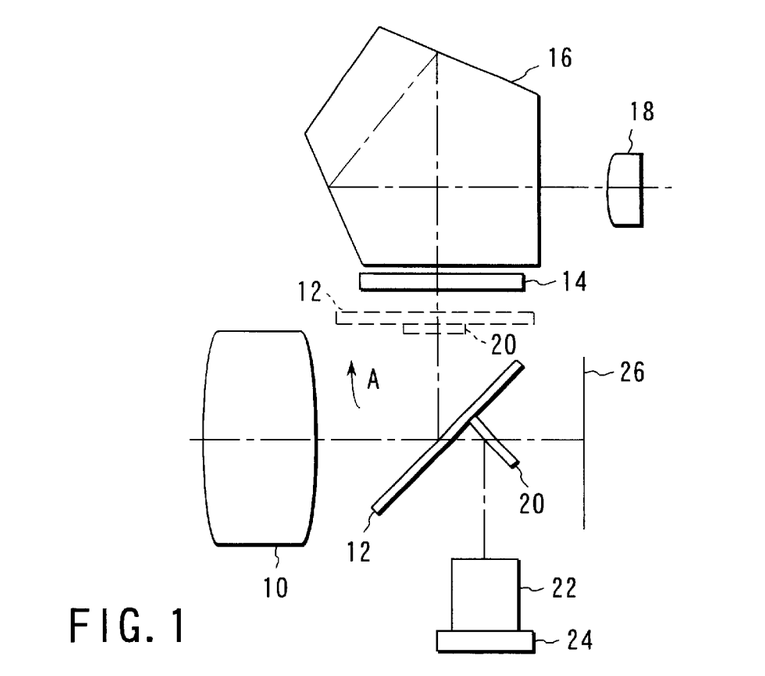
FIG. 1 is a light-path diagram of a camera to which a focus detector of a first embodiment of the present invention is applied.

FIG. 1 is an optical-path diagram of a camera to which a focus detector according to a first embodiment of the present invention is applied.

Referring to FIG. 1, a beam flux of an image-picked-up object that has passed through an image pick-up optical system 10 is partly reflected by a main mirror 12, which is a half-mirror. This part of the beam flux of the object reflected by the main mirror 12 passes through a focusing plate 14 and is formed as an erect image by a pentaprism 16. Further, this erect image passes through an ocular 18, and is observed as an image of the imaged object by a photographer.

On the other hand, a part of the beam flux of the object passed through the main mirror 12 is reflected by a sub-mirror 20 which is a total reflection mirror mounted to the main mirror 12, and is guided to a focus detection optical system 22. The focus detection optical system 22 re-forms an image of the focus detection beam flux on an image pick-up device 24.

At the time of photographing an object, the main mirror 12 and the sub-mirror 20 are rotated in an arrow A direction and are moved to a position shown by a broken line in FIG. 1. Thus, the main mirror 12 and the sub-mirror 20 are retracted from the beam incident path. As a result, the beam flux of the picked-up image is guided to a film 26.

Details of the image pick-up device 24 will be explained next with reference to FIGS. 2 to 4.

The image pick-up device 24 is for picking up an image of an object to be formed by the focus detection optical system 22 and for converting this picked-up image into an electric signal. The image pick-up device 24 is constituted by a vertical overflow drain type CCD to have a structure as shown in FIGS. 2 and 3.

As a charge transfer type image pick-up device, an interline transfer type CCD is used. This image pick-up device 24 is the same as a general-purpose image pick-up device that is used for a digital camera or the like.

Figure 2:
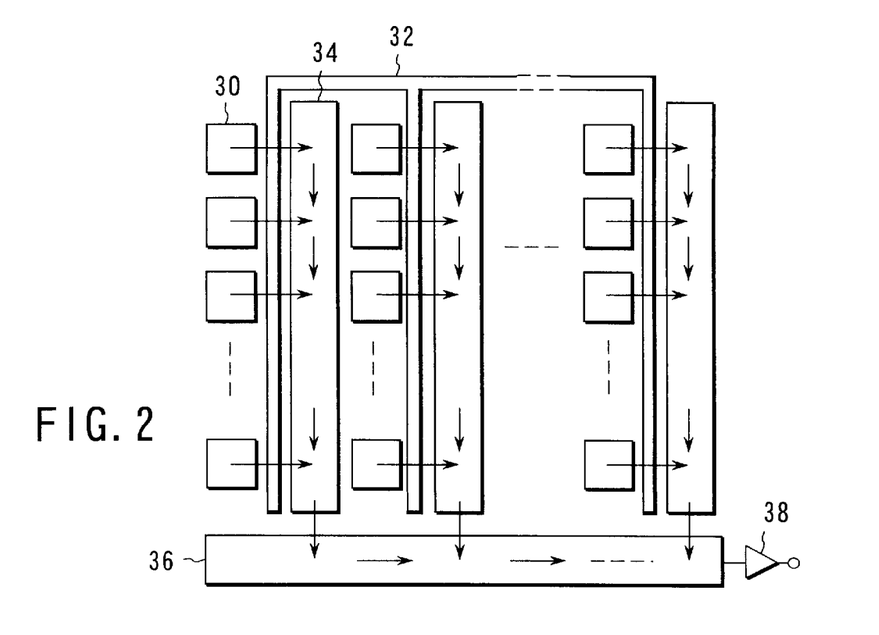
FIG. 2 is a diagram for explaining a structure of an image pick-up device of FIG. 1.

In FIG. 2, the image pick-up area of the image pick-up device 24 consists of photodiodes 30 that are arrayed two-dimensionally in a horizontal direction and a vertical direction, a transfer gate 32 for transferring electric charges stored in the photodiodes 30 to vertical shift registers 34, the vertical shift registers 34 for sequentially transferring the transferred electric charges in a vertical direction (arrow directions shown in FIG. 2), a horizontal shift register 36 for sequentially transferring in a horizontal direction (arrow directions shown in FIG. 2) the electric charges that have been transferred in a vertical direction by the vertical shift registers 34, and an output section 38 for converting the electric charges that have been transferred in a horizontal direction by the horizontal shift register 36 into voltage signals and outputting these voltage signals.

A micro lens is structured in front of each of the photodiodes 30 that are the light-receiving elements. As a technique for improving the optical sensitivity of the image pick-up device 24, the micro lens is provided at a position corresponding to each photodiode, thereby to efficiently collect incident light beams to the light-receiving section. This technique is what is called an on-chip micro lens. This is an established technique that has been generally employed.

Figure 3:
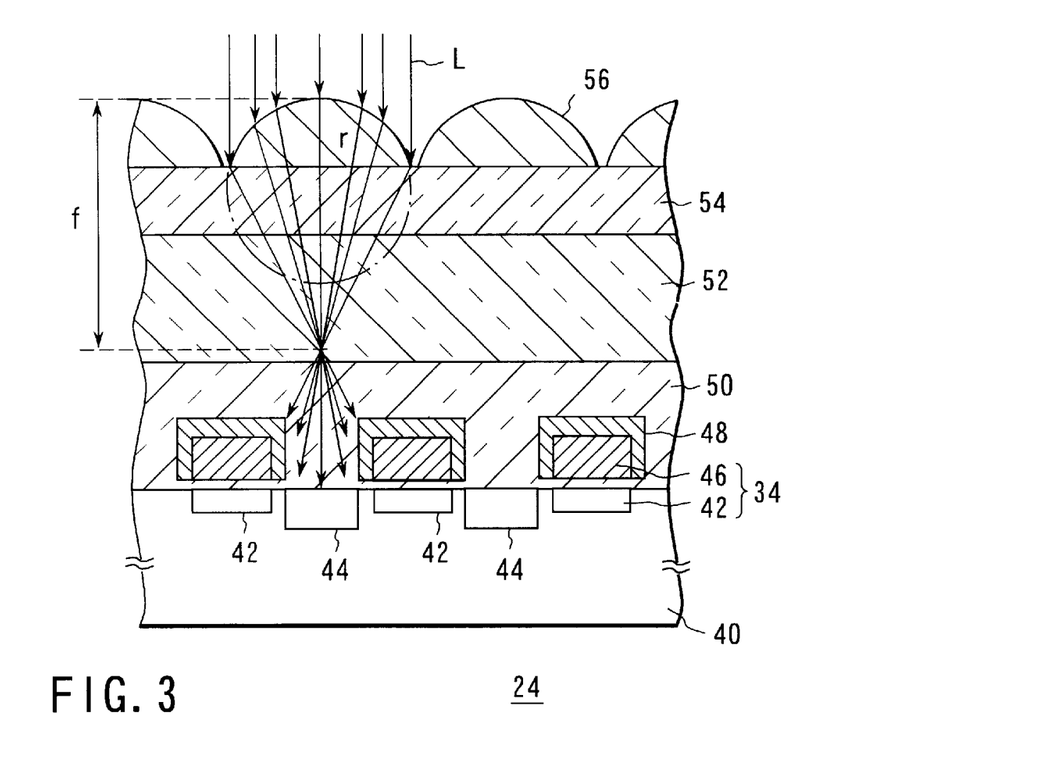
FIG. 3 is a cross-sectional view of a solid image pick-up device (CCD) having on-chip micro lenses formed according to the first embodiment, viewed from a horizontal direction.

FIG. 3 is a cross-sectional view of the solid image pick-up device (CCD) 24 having the on-chip micro lenses formed according to the present embodiment. The solid image pick-up device is viewed from a horizontal direction, that is, from a direction orthogonal with a transfer direction of the vertical shift registers 34.

In FIG. 3, charge transfer sections 42 that constitute the vertical shift registers 34 and photodiodes that constitute light-receiving sections 44 are formed by diffusion layers and the like within semiconductor substrate 40 made of silicon. On each charge transfer section 42, there is formed a vertical transfer electrode 46 through an insulation film not shown. Further, a light-shielding film 48 is formed on to cover each vertical transfer electrode 46. The light-receiving sections 44 are formed corresponding to apertures of the light-shielding films 48.

A transparent flat layer 50 is formed on the light-receiving sections 44 and the light-shielding sections 48 to cover these sections. On the transparent flat layer 50, there are sequentially formed a color filter 52 and a transparent flat layer 54.

On the transparent flat layer 54, there are formed a plurality of micro lenses 56 each having a spherical surface of a focal distance f with a predetermined curvature r. Each micro lens 56 is set such that parallel beams that are vertically incident to the image pick-up device 24 can be efficiently focused on each light-receiving section 44 (photodiode). Accordingly, the incident beams can be efficiently received by the telecentric optical system. In other words, the aperture rate is improved in this way.

Figure 4:
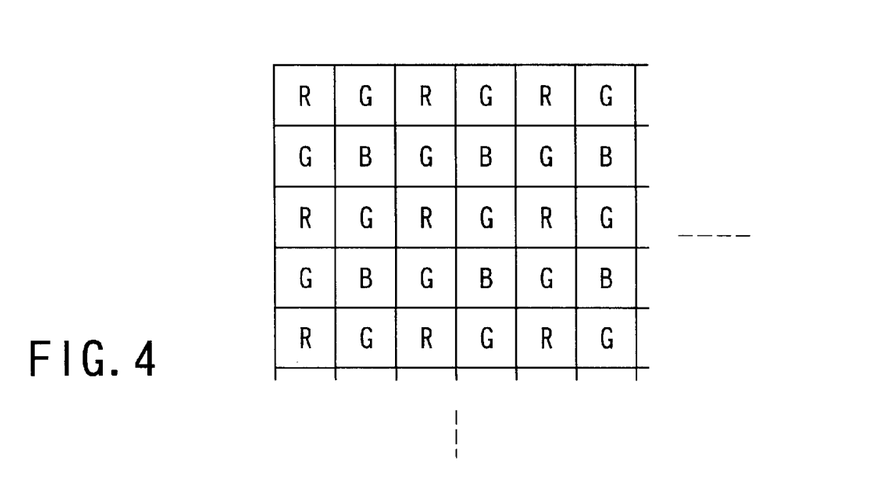
FIG. 4 is a diagram that shows a layout of color filters disposed on the front surface of a photodiode.

FIG. 4 shows a layout of the color filters 52 disposed in front surface of the photodiodes 44. The color filters 52 has what is called a Bayer layout.

In FIG. 4, R, G and B denote color filters for selectively transmitting red color, green color and blue color respectively.

The focus detection optical system will be explained in detail next.

Figure 5A:
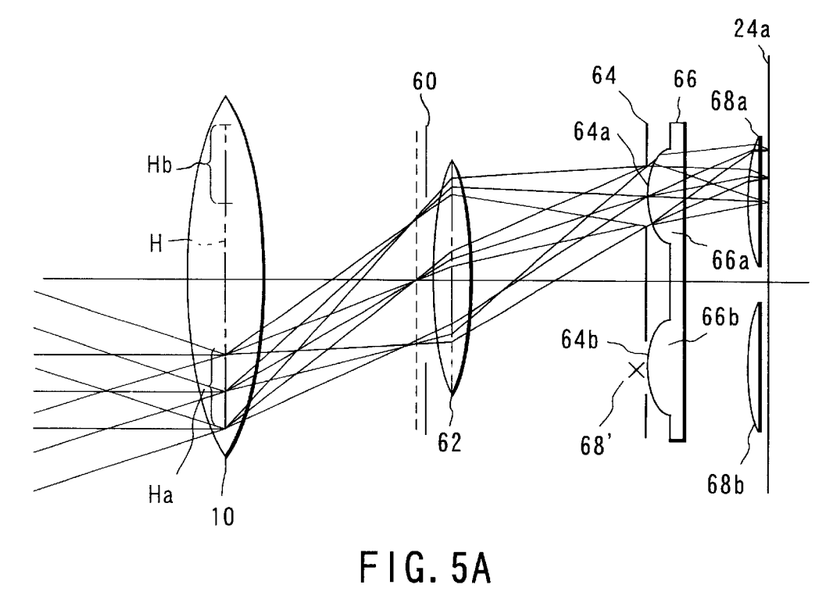
FIG. 5A is a side cross-sectional view and FIG. 5B is a perspective view.
Figure 5B:
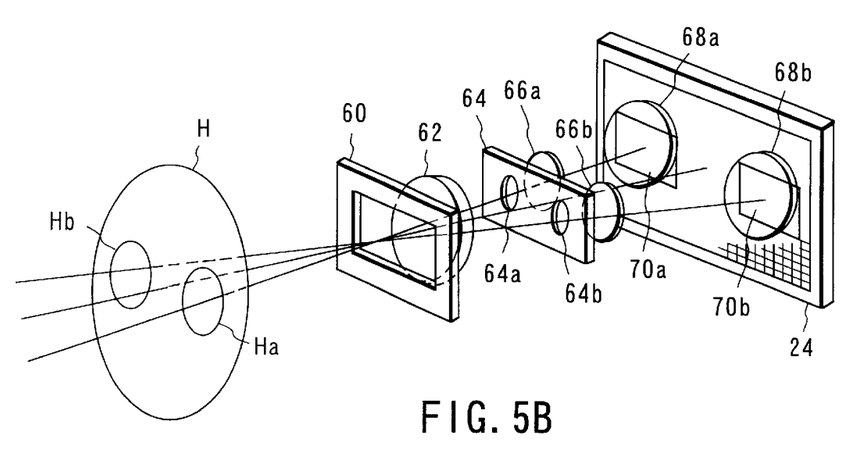

FIGS. 5A and 5B show a structure of the image pick-up lens 10 and the focus detection optical system 22. FIG. 5A is a side cross-sectional view and FIG. 5B is a perspective view.

FIGS. 5A and 5B omit the main mirror 12, the sub-mirror 20 and the like, to simplify the explanation.

In FIGS. 5A and 5B, a beam flux is incident from the left side. At the rear side of the image pick-up lens (or a taking lens: T. L.) 10, there are sequentially disposed a view-field mask 60, a condenser lens (C. L.) 62, a brightness diaphragm 64 having apertures 64a and 64b approximately symmetrically disposed with respect to the optical axis of the image pick-up lens 10, image re-forming lenses (66a, 66b) disposed at the back of the brightness diaphragm 64, and correction lenses 68a and 68b respectively.

Light beam fluxes of an image-picked-up object are incident through areas Ha and Hb of an injection pupil H of the image pick-up lens 10. The beam fluxes pass through the view-field mask 60, the condenser lens 62, the apertures 64a and 64b of the brightness diaphragm 64, and the image re-forming lenses 66a and 66b. The beam fluxes are then received on focus detection light-receiving areas 70a and 70b to be described later on an image pick-up area surface 24a of the image pick-up device 24, so that images are formed again on these areas.

A structure of a focus detection optical system of a general image re-forming system will be explained with reference to FIGS. 6A and 6B.

Figure 6A:
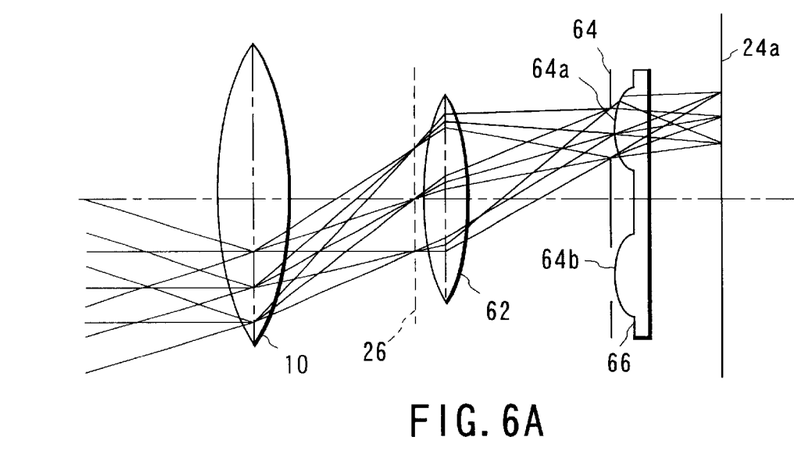
FIGS. 6A and 6B are diagrams that show a structure of a focus detection optical system according to a general image re-forming system.
Figure 6B:
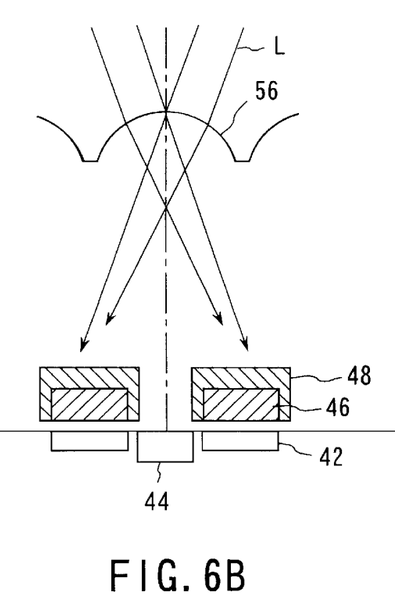

As shown in FIG. 6A, a main beam which is incident to the image pick-up area surface 24a of the image pick-up device has an inclination instead of being incident to the image pick-up device 24 at a right angle. When this image pick-up device 24 is used in the focus detection optical system, there occur the following problems.

The on-chip micro lenses 56 on the image pick-up device 24 are set such that parallel beams incident vertically to the image pick-up device 24 can be efficiently focused on the light-receiving section (photodiodes) 44. Therefore, when the light beams are incident in the state as shown in FIG. 6A, a light beam L is vignetted as shown in FIG. 6B. Accordingly, the received light quantity decreases, or it becomes impossible to receive light beams at all at the peripheral portion of the focus detection area where the inclination of the light beams becomes large. As a result, it is not possible to detect the focus.

In order to solve the above problems, the correction lenses 68a and 68b are disposed. The correction lenses 68a and 68b and the image re-forming lenses 66a and 66b constitute the telecentric optical system.

As shown in FIG. 5A, a front-side focus position 68' of the correction lenses 68a and 68b is located near the brightness diaphragms 64a and 64b, and is disposed near the image pick-up device 24. Further, the correction lenses 68a and 68b work such that the main beams that have been incident to the image pick-up device 24 are set perpendicular to the image pick-up device 24. Therefore, the beam fluxes passed through the correction lenses 68a and 68b are not vignetted by the micro lenses 56 disposed on the image pick-up device 24, so that the beam fluxes are efficiently incident to the photodiodes 44 (30).

Figure 7:
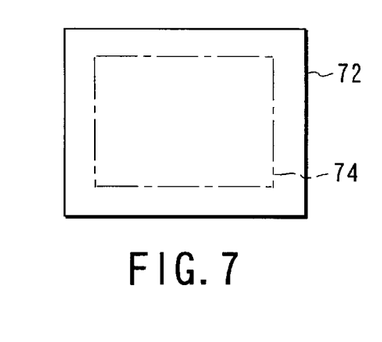
FIG. 7 is a diagram that shows a focus detection area within an image pick-up screen.

FIG. 7 is a diagram that shows a focus detection area 74 within an image pick-up screen 72.

Figure 8:
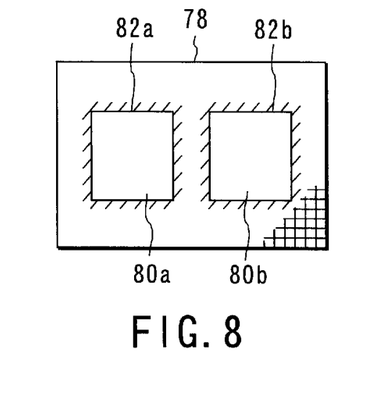
FIG. 8 is a diagram that shows a structure of an image pick-up area that forms a light-receiving area of the image pick-up device.

FIG. 8 is a diagram that shows a structure of an image pick-up area 78 constituting the light-receiving section of the image pick-up device 24.

In the image pick-up area 78 that constitutes the light-receiving section of the image pick-up device 24, there are shown focus detection light-receiving areas 80a and 80b corresponding to the focus detection area 74. The focus detection light-receiving areas 80a and 80b are located within view-field mask images 82a and 82b that are defined by the view-field mask 60 of the focus detection optical system 22. A focus detection calculation is carried out based on pixel signals of the image pick-up device 24 within the focus detection light-receiving areas 80a and 80b.

The positions of the focus detection light-receiving areas 80a and 80b within the light-receiving area of the image pick-up device 24 are stored in a nonvolatile memory EEPROM to be described later in advance at the time of assembling the camera. The pixel data within the focus detection light-receiving areas 80a and 80b are used at the time of detecting the focus based on the above position data.

Figure 9:
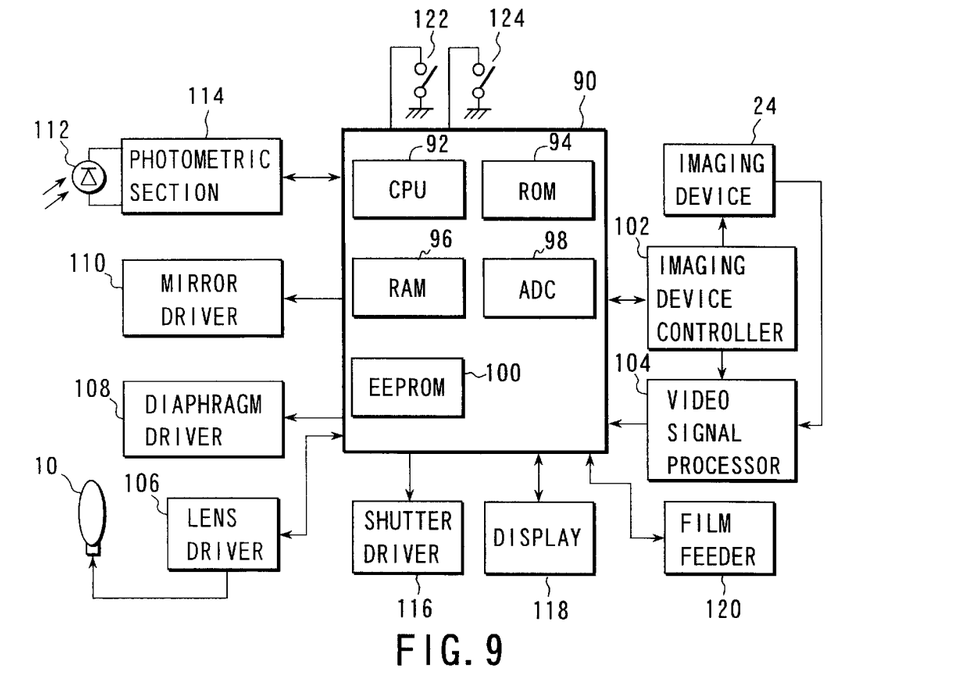
FIG. 9 is a block diagram that shows an electrical structure of a camera according to the first embodiment.

An electrical structure of this camera will be explained next with reference to FIG. 9.

A microcomputer 90 is a controller of the present camera. Inside this microcomputer 90 or the controller, there are disposed a CPU (a central processing unit) 92, a ROM 94, a RAM 96, an A/D converter (ADC) 98, an EEPROM 100, and the like. The camera carries out a series of operations according to a sequence program stored in the ROM 94 of the microcomputer 90.

The EEPROM 100 stores correction data relating to a focus adjustment, a photometry, exposure calculation, and the like for each camera.

To the microcomputer 90, there are connected an image pick-up device controller 102 that outputs a drive signal to the image pick-up device (CCD) 24 and controls the operation thereof, and a video signal processor 104 that processes pixel signals from the image pick-up device 24 that are electrical signals, and prepares video signals.

Further, to the microcomputer 90, there are also connected a lens driver 106 that drives the image pick-up lens 10 based on a command from the microcomputer 90, a diaphragm driver 108 that drives the open/close operation of the diaphragms not shown based on a command from the microcomputer 90, a mirror driver 110 that carries out an up-and-down operation of the main mirror 12, and a photometric section 114 that processes a photocurrent from a photometric device 112 and generates a photometric output. Within the microcomputer 90, the A/D converter 98 A/D-converts the photometric output and stores this result in the RAM 96.

Further, to the microcomputer 90, there are also connected a shutter driver 116 that drives a focal-plane shutter not shown, a display 118 that displays on the display device such as an LCD information inside the camera and an a photographing mode based on the instruction from the microcomputer 90, and a film feeder 120 that autoloads, winds up by one frame and rewinds the role of film 26.

A first-release switch (1RSW) 122 and a second-release switch (2RSW) 124 are switches connected to a release button. When the release button is depressed at a first stage, the first-release switch 122 is turned ON, and when the release button is depressed at a second stage, the second-release switch 124 is turned ON. When the first-release switch 122 has been turned ON, the microcomputer 90 carries out a photometry and an AF operation. When the second-release switch 124 has been turned ON, the microcomputer 90 carries out an exposure and a film winding.

Figure 10:
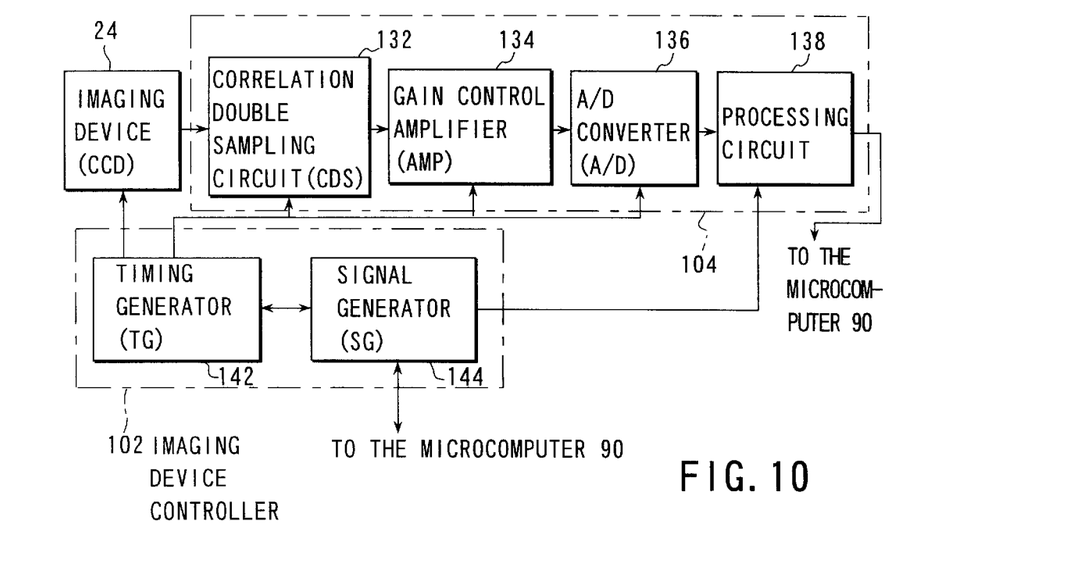
FIG. 10 is a block diagram that shows a structure of a video signal processor and its periphery.

FIG. 10 is a block diagram that shows a structure of the video signal processor 104 and its periphery.

In FIG. 10, a correlation double sampling circuit (CDS) 132 is a circuit that removes reset noise and the like from an image signal sent from the image pick-up device (CCD) 24. An output from the correlation double sampling circuit 132 is supplied to a gain control amplifier (AMP) 134, and is amplified at a predetermined gain.

An output from the gain control amplifier 134 is A/D-converted into a digital signal by an A/D converter (A/D) 136. A video signal obtained as the digital signal by the A/D converter 136 is then processed by a processing circuit 138.

The image pick-up device controller 102 is for outputting a drive signal to the image pick-up device 24 and controlling the image pick-up device, and is constituted by a timing generator (TG) 142 and a signal generator (SG) 144.

The timing generator 142 generates drive signals such as transfer pulses for driving the image pick-up device 24, and also generates a sample holding pulse of the correlation double sampling circuit 132 and an A/D conversion timing pulse of the A/D converter 136. The signal generator 144 generates a signal for synchronizing the timing generator 142 with the microcomputer 90.

The main routine operation of the camera according to the first embodiment of the present invention will be explained next with reference to a flowchart shown in FIG. 11 and timing charts shown in FIGS. 12A to 12F.

When a power source switch not shown has been turned ON or when batteries have been inserted into the camera main body, the operation of the microcomputer 90 is started and the sequence program stored in the ROM 94 inside the camera is executed.

First, in step S1, each block within the camera is initialized. The data stored in the EEPROM 100 is read out and is then expanded to the RAM 96.

In step S2, the state of the first-release switch 122 is detected. When the first-release switch 122 is OFF, the process proceeds to a step S3. At the step S3, the photometric section 114 carries out a photometry, and stores the measured photometric value. In step S4, based on the information such as the photometric value, there is carried out a photometry and exposure calculation for calculating a diaphragm control value for an exposure, a shutter speed and the like. Then, the process proceeds to the step S2.

When the first-release switch 122 has been turned ON at the step S2, the process proceeds to a step S5. At the step S5, the focus detection light-receiving areas 80a and 80b of the image pick-up device 24 are stored.

Figure 12A:
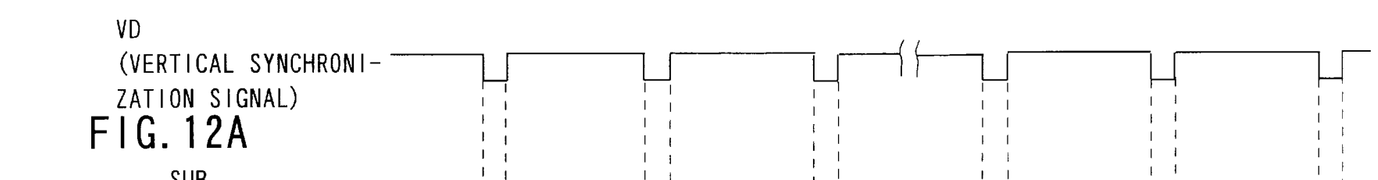
FIGS. 12A to 12F are timing charts for explaining the operation of the main routine of the camera according to the first embodiment of the present invention.

In FIG. 12A, a vertical synchronization signal VD is a signal that becomes an operation reference of an image pick-up operation generated by the signal generator 142 within the image pick-up device controller 102. In the image pick-up device controller 102, a charge sweeping signal SUB shown in FIG. 12B is cut off, and the image pick-up device 24 starts the storing operation (a period T1).

Figures 12B, 12C:
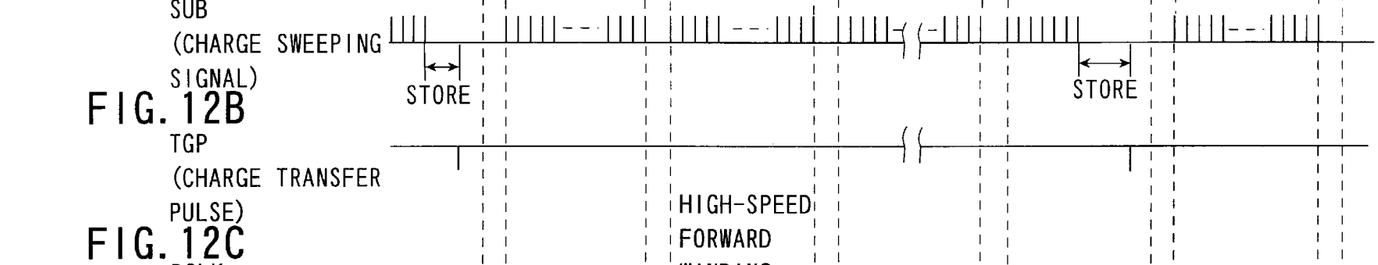
Figure 12D:
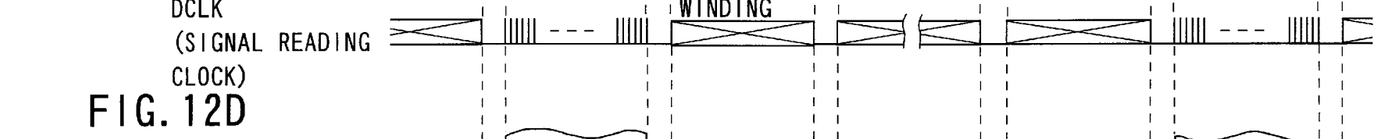
Figure 12E:
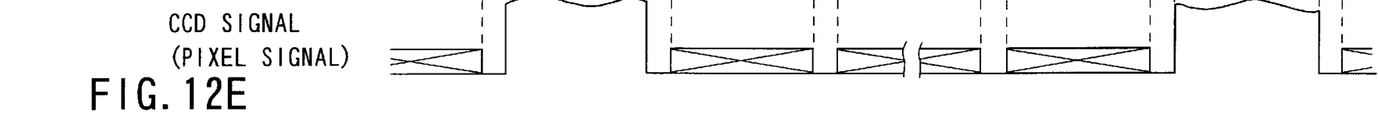

After a lapse of a predetermined period of storing time, a charge transfer pulse TGP shown in FIG. 12C is generated, and the stored charges of the photodiodes 30 are transferred to the vertical shift registers 34.

In step S6, the image signals of the focus detection light-receiving areas 80a and 80b are read out. The image pick-up device controller 102 outputs a signal DCLK shown in FIG. 12D to the image pick-up device 24. At the same time, a pixel signal (a CCD signal) of the image pick-up area 78 shown in FIG. 12E that is output in synchronism with the signal DCLK is A/D-converted and is read in the vide signal processor 104 (a period T2).

In step S7, a focus detection calculation is carried out based on pixel signals corresponding to the focus detection light-receiving areas 80a and 80b stored in advance in the EEPROM 100 out of all the pixel signals that have been read out (a period T3).

In step S8, a decision is made as to whether a result of the focus detection calculation is that the pixel signals are in focus or not. When a decision is that the pixel signals are in focus, the process proceeds to a step S10 to be described later. On the other hand, when the decision has been made that the pixel signals are not in focus, the process proceeds to a step S9. At the step S9, a move quantity of the focus adjustment optical system is calculated so that the pixel signals become in focus based on a result of the focus detection calculation, and the image pick-up lens is driven by the lens driver 106 (a period T4).

Figure 11:
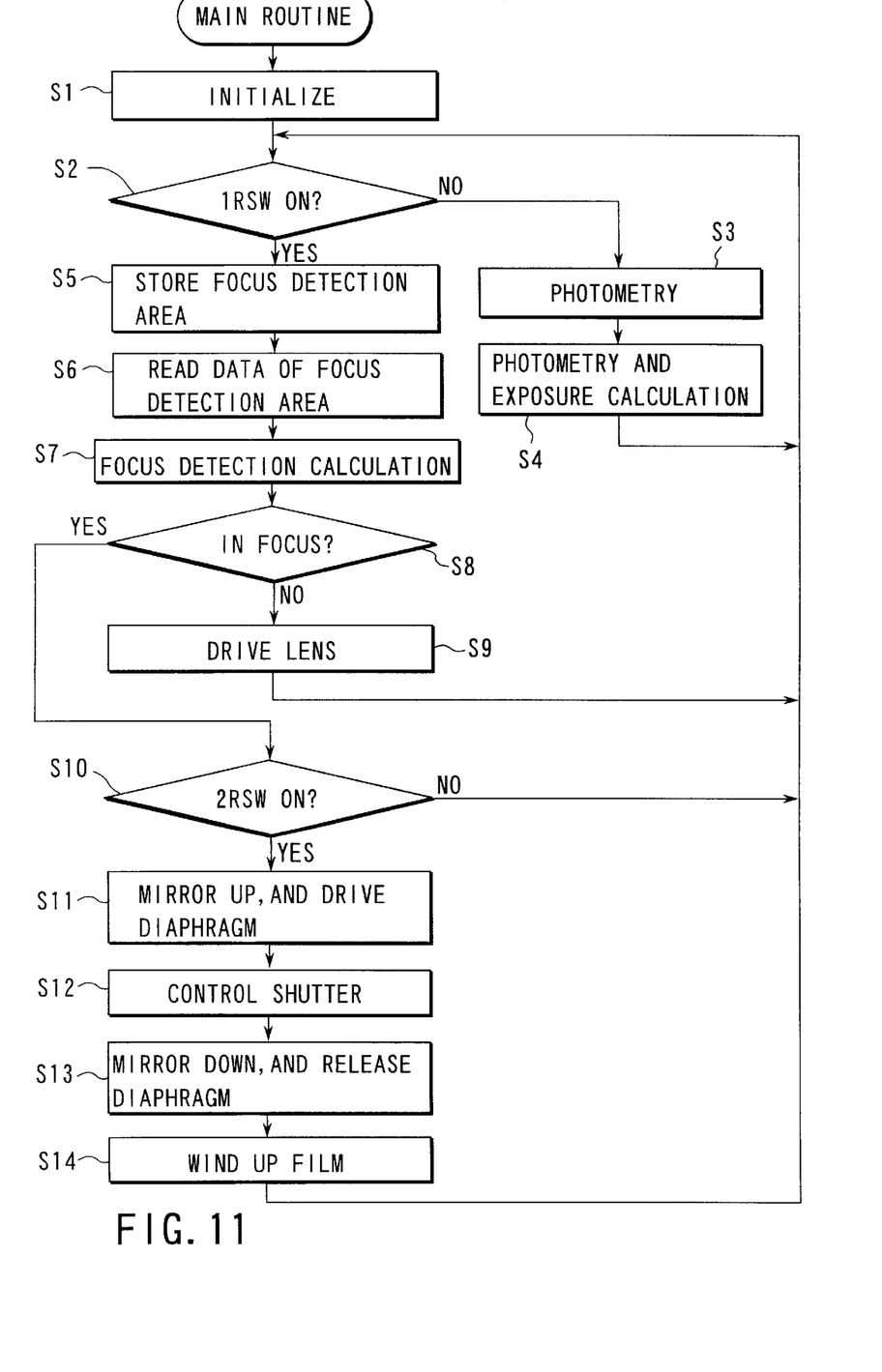
FIG. 11 is a flowchart for explaining the operation of a main routine of the camera according to the first embodiment.
Figure 12F:
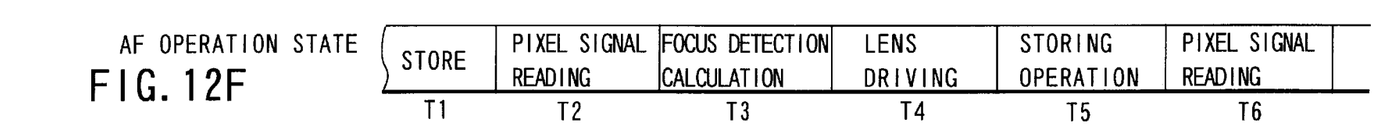

Thereafter, the process proceeds to the step S2, and the AF operation is repeated until when the pixel signals become in focus as shown in FIG. 12F (periods T5, T6, . . . ).

In the timing charts shown in FIGS. 12A to 12F, a high-speed forward winding of a reel of film means a high-speed sweeping of an unnecessary charge within transfer paths (vertical and horizontal registers) of the image pick-up device 24. This is a preliminary operation carried out before transferring a signal charge.

When a decision has been made at the step S8 that the pixel signals are in focus, the state of the second-release switch 124 is detected in step S10. When the second-release switch 124 has been in the ON state, the process proceeds to a step S11 to be described later. On the other hand, when the second-release switch 124 has been in the OFF state, the process proceeds to the step S2, where the AF operation is continued while waiting for the time when the second-release switch 124 is turned ON.

At the step S11, the diaphragm driver 108 is controlled by the microcomputer 90, and a diaphragm not shown is set to an exposure diaphragm value. At the same time, a mirror-up operation is carried out by the mirror driver 110. In step S12, the shutter is driven by the shutter driver 116 at a shutter speed based on the exposure calculation, and the exposure is carried out.

In step S13, the microcomputer 90 controls the diaphragm driver 108 so that the diaphragm not shown is set to a diaphragm release state. At the same time, the mirror driver 110 sets down the mirror. In step S14, a film feeder 120 winds up the role of film 26 by one frame.

The above explains the series of image pick-up operation. After the above operation, the process returns to the step S2, and a similar operation is repeated.

A modification of the first embodiment will be explained next.

An example to be explained next is a modification of the storing and reading operation in the focus detection areas at the steps S5 and S6 of the flowchart shown in FIG. 11 for the first embodiment.

Figure 13:
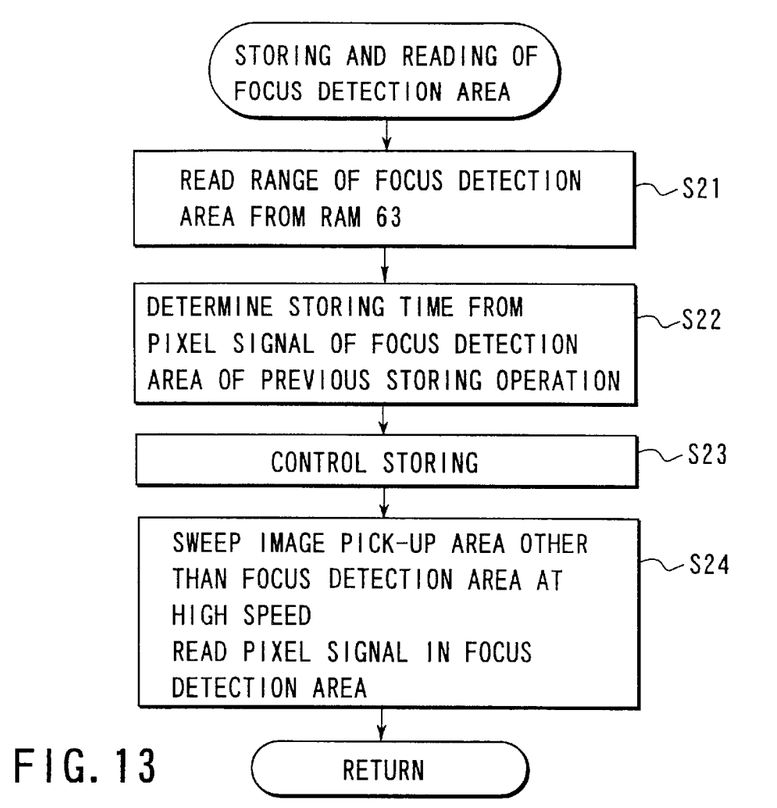
FIG. 13 is a flowchart for explaining a modification of the first embodiment.
Figure 14:
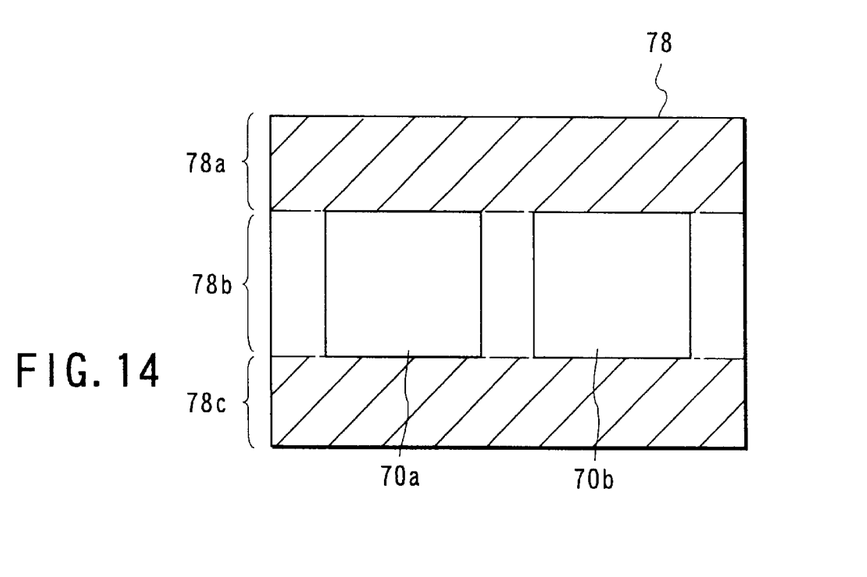
FIG. 14 is a diagram for explaining the modification of the first embodiment, which shows image picked-up area.
Figure 15:
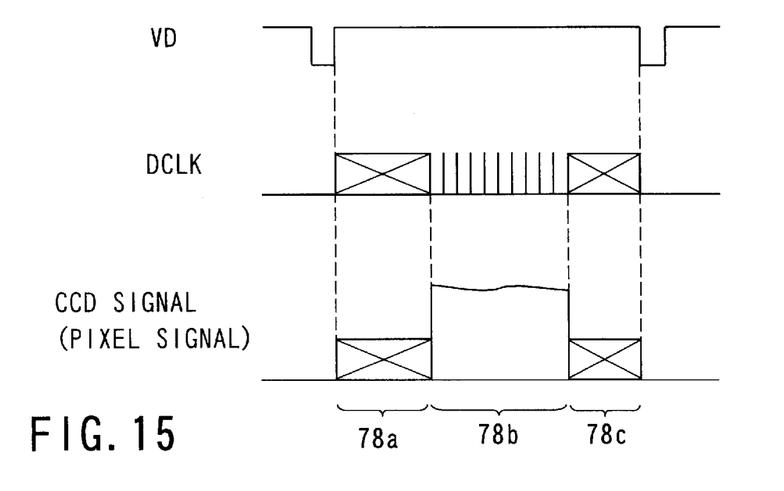
FIG. 15 is a timing chart for explaining the modification of the first embodiment.

This modification of the first embodiment will be explained next with reference to a flowchart shown in FIGS. 13, 14 and 15.

First, in step S21, data relating to an effective pixel range of the focus detection areas 80a and 80b in the image pick-up area 78 are read out from the RAM 96 within the microcomputer 90. The effective pixel range is different depending on the camera. The effective pixel range is checked at the plant when the camera is manufactured, and is written into the EEPROM 100 for each camera. The effective pixel range has already been expanded in the RAM 96.

In step S22, a storing time for obtaining an optimum pixel signal is obtained with reference to the pixel signal data within the focus detection area 74 according to the preceding storing operation.

In step S23, the storing operation of the image pick-up device 24 is controlled based on the obtained storing time. In step S24, the pixel signals are read out. The pixel signals of the image pick-up area 78 other than the focus detection area 74 are not used for focus detection. Therefore, a high-speed sweeping operation is carried out in order to reduce the reading time. The pixel signals are read out corresponding to the portions of the focus detection area 74 that is the effective pixel range stored in the EEPROM 100.

It is possible to improve the response of the AF operation by decreasing the reading time as explained above.

Figure 16:
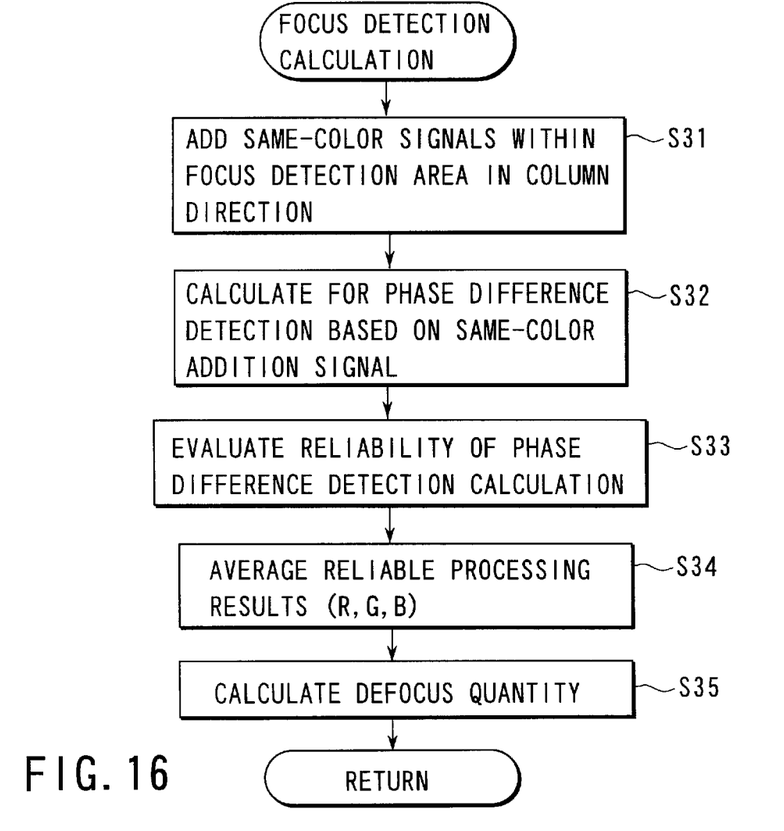
FIG. 16 is a flowchart for explaining the operation of a focus detection calculation at step S7 of the flowchart shown in FIG. 11.

FIG. 16 is a flowchart for explaining the operation of the focus detection calculation at the step S7 of the flowchart shown in FIG. 11.

The focus detection calculation is a known phase-difference detection system, and therefore, a detailed explanation of this system is omitted. Only the characteristics of the present embodiment will be explained next.

Figure 17:
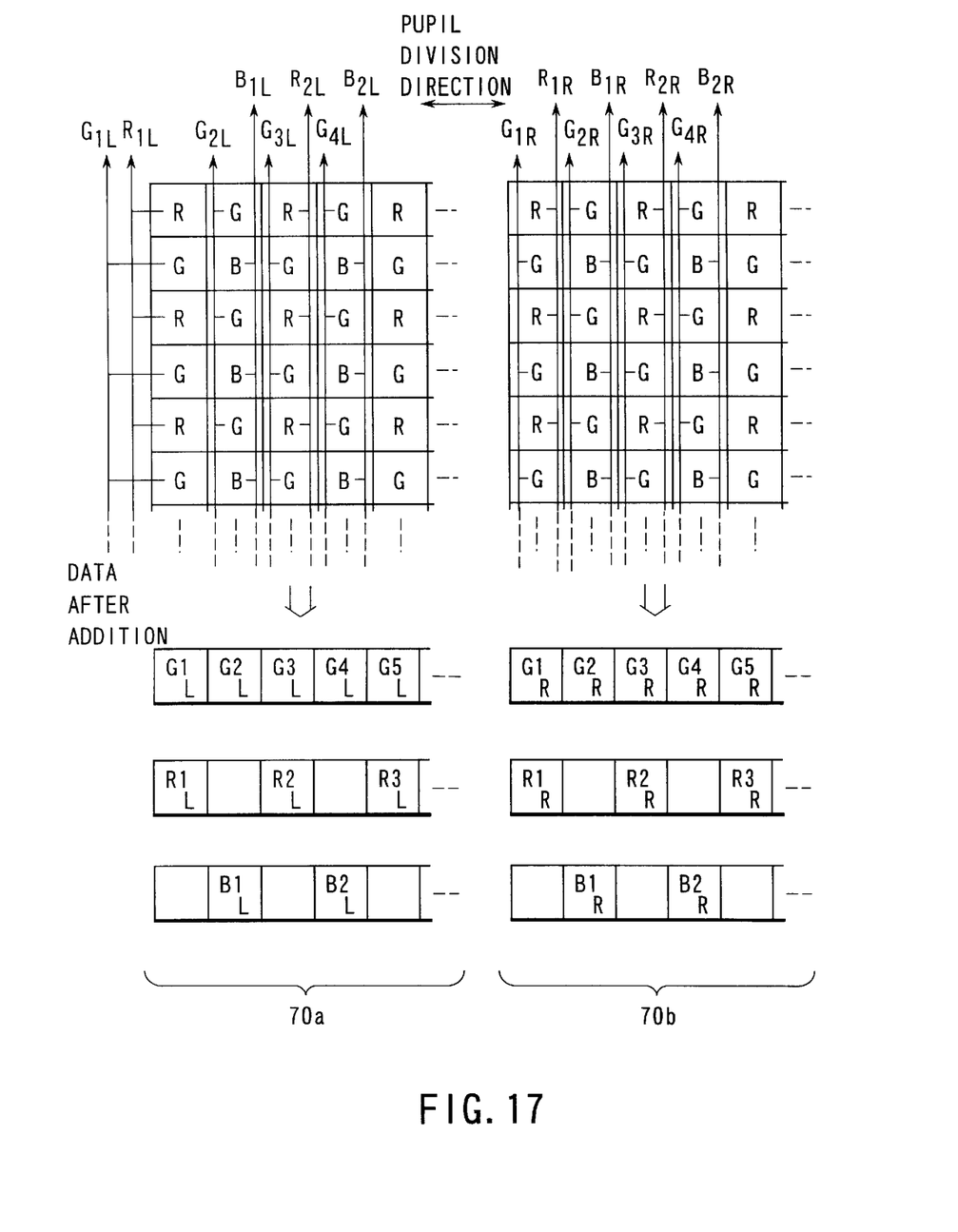
FIG. 17 is a diagram for explaining the focus detection calculation.

In step S31, for the pixel signals of the same colors in the focus detection areas 70a and 70b, pixel signals in the direction vertical to the pupil division direction, that is, in the column direction, are added together. This addition is carried out for each of the R, G and B. Pixel signals that have been read out (digital signals) are added together (refer to FIG. 17). step S32, the known phase-difference detection calculation is carried out based on the same-color added signals. This is also carried out for each of the R, G and B. For example, the phase difference detection calculation is carried out between the added data $G_{1L}$, $G_{2L}$, $G_{3L}$, ... and $G_{1R}$, $G_{2R}$, $G_{3R}$, ... which are shown in FIG. 17.

In step S33, the reliability of the phase difference detection calculation of the added data of the R, G, B is evaluated respectively. A decision is made as to whether it is possible to detect a phase difference or not. In step S34, a detectable calculation result is selected, and an averaging is carried out. In step S35, a defocus quantity is calculated based on the result of the calculation. Then, the process returns.

Figure 18:
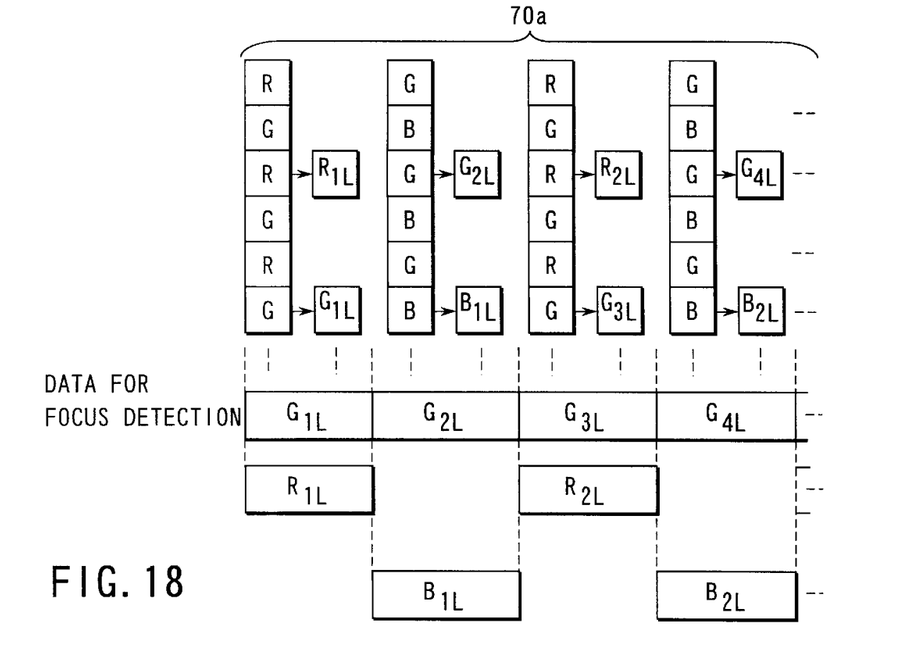
FIG. 18 is a diagram for explaining another example of a focus detection calculation.

FIG. 18 shows a modification of the above focus detection calculation. This shows a state of reading the pixel signals within the focus detection area 70a by thinning the data reading. A similar processing is also carried out for the focus detection area 70b.

The reading by thinning the data can be easily achieved by controlling the operation of the vertical shift registers 34 by the manipulation of the reading clock when the image pick-up device is a CCD, as disclosed in Jpn. Pat. Appln. KOKAI Publication No. 10-136244.

As shown in FIG. 18, it is possible to increase the calculation speed by increasing the reading time and by decreasing the number of pixel signals, by reading only the predetermined number of (every two other pixel signals in the case of FIG. 18) pixel signals in the column direction (that is, in the direction of the vertical shift registers 34).

Figure 19:
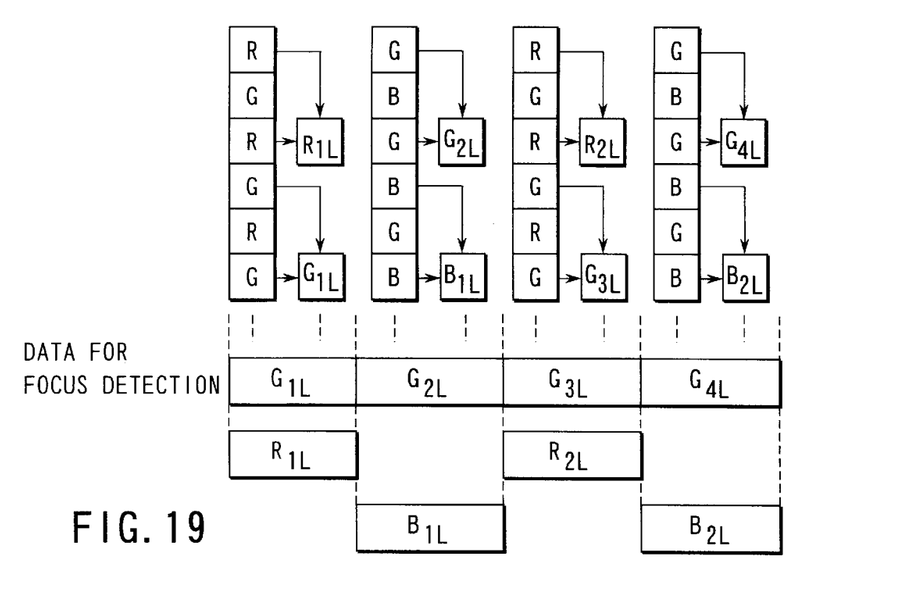
FIG. 19 is a diagram for explaining still another example of a focus detection calculation.

FIG. 19 shows a further modification example of the focus detection calculation. This shows a state of adding and reading the pixel signals within the focus detection area 74 by thinning the data reading.

As shown in FIG. 19, when the pixel charges of the same color are added and read at every other pixel charge in the column direction within the vertical shift registers 34, it is possible to increase the calculation speed through speed-up of the reading time and reduction in the number of pixel signals.

In the above first embodiment, there is used the color image pick-up device incorporating color filters. However, it is also possible to use a monochromatic image pick-up device that does not incorporate color filters. In this case, as it is not necessary to distinguish between colors, it is possible to omit the addition processing for each color or to simplify the focus detection calculation. Thus, is possible to decrease the focus detection time lag. Further, as the monochromatic image pick-up device itself is provided at low cost, it is possible to further decrease the cost of the focus detector.

As explained above, according to the first embodiment, the focus detection optical system is provided as a telecentric system. Therefore, it is possible to use the general-purpose image pick-up device as a focus-detection area sensor. As a result, it is possible to carry out the focus detection over a wide field of view without increasing the cost.

Further, as the image pick-up device mounted with an on-chip micro lens can be applied, it is possible to improve the light-receiving quantity and to improve the S/N ratio. This results in the improvement in the focus detection precision.

A cylindrical lens may be used for the correction lens. The cylindrical lens is suitable for a line-shaped focus detection area.

The correction lens may also be formed by a Fresnel lens, a DOE (a diffractive optical element), and the like.

A second embodiment of the present invention will be explained next.

The second embodiment is an application of the focus detector of the present invention to an external-beam passive system.

Figure 20A:
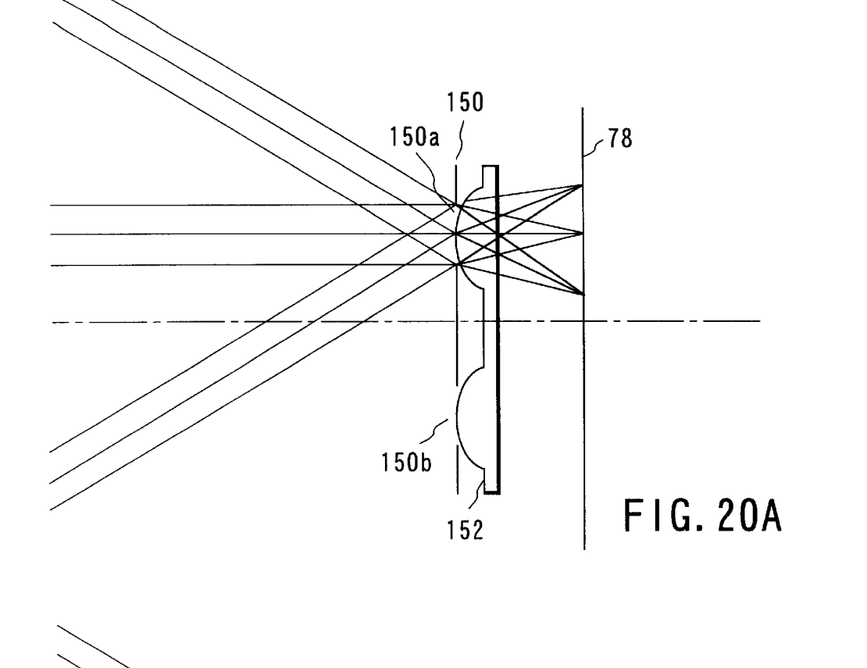
FIG. 20A shows one example of a general external-beam passive optical system.
Figure 20B:
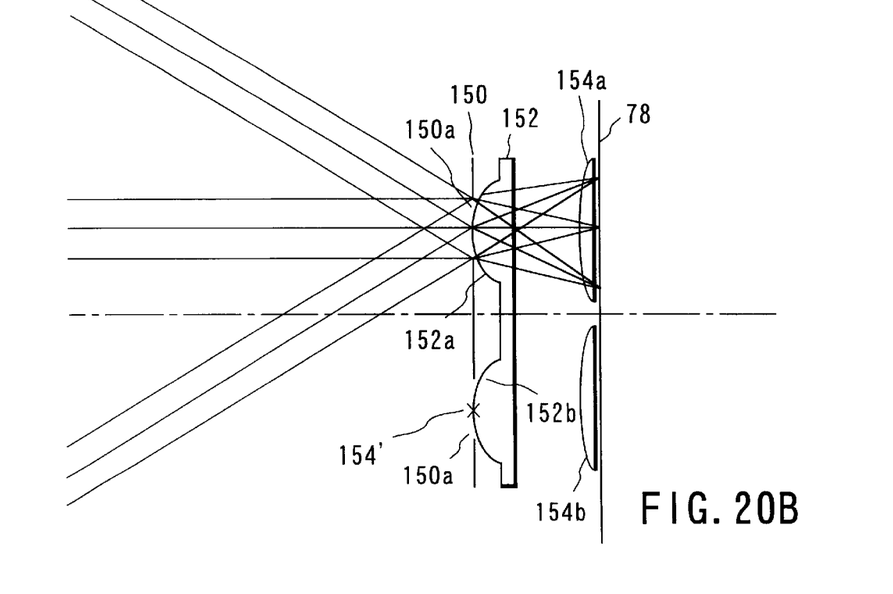
FIG. 20B shows one example of an external-beam passive optical system according to the second embodiment.

FIGS. 20A and 20B show structures of a focus detection optical system of an external passive system. FIG. 20A is a diagram showing an example of a general external-beam passive optical system, and FIG. 20B is a diagram showing an example of an external-beam passive optical system according to the second embodiment.

In FIG. 20A, incident beam fluxes pass through a view-field diaphragm 150 having apertures 150a and 150b, and reach an image pick-up area 78 of an image pick-up device through an image-forming lens 152. According to the general external-beam passive optical system, the main beam incident to the image pick-up device is not perpendicular to the surface of the image pick-up area 78. Therefore, this has a problem that the beam fluxes are vignetted by the operation of the micro lenses (not shown) disposed on the image pick-up device, so that it is not possible to correctly measure a distance.

FIG. 20B shows an example of the external-beam passive optical system according to the second embodiment.

In FIG. 20B, incident beam fluxes pass through a view-field diaphragm 150 having apertures 150a and 150b, and reach an image pick-up area 78 of an image pick-up device through an image-forming lenses 152 (152a and 152b) and through correction lenses 154a and 154b. Beam fluxes incident from an image picked-up object pass through the apertures 150a and 150b of the view-field diaphragm 150, the image-forming lenses 152a and 152b, and the correction lenses 154a and 154b, and are then formed in two-split images on the image pick-up area 78 of the image pick-up device.

The image pick-up device is similar to that of the first embodiment. A distance from the image picked-up object is obtained based on a relative positional relationship between the two images by using pixel signals of the image pick-up device. This distance-measuring system is a known technique, and therefore, will not be explained here.

As shown in FIG. 20B, according to the second embodiment, the correction lenses 154a and 154b are added to a general external-beam passive optical system to provide a telecentric optical system. Based on this optical system, the main beam incident to the image pick-up device is corrected to become perpendicular to the surface of the image pick-up area 78.

In other words, the correction lenses 154a and 154b are disposed so that a correction lens front side focus position 154' is positioned near the diaphragms 150a and 150b respectively. Further, the correction lenses 154a and 154b are disposed near the image pick-up area 78 of the image pick-up device.

Based on the above structure, it is possible to efficiently pick-up a image of the object without vignetting of the beam fluxes by the micro lenses on the image pick-up device. As a result, it is possible to carry out an accurate measurement of the distance.

The correction lenses 154a and 154b may be one integrated unit instead of the two units. Also, the image-forming lens 152 and the correction lens 154 may be integrated together.

In the above embodiments, the image pick-up device has been explained as a CCD. However, the image pick-up device is not limited to the CCD. This may also be a solid image pick-up device of a MOS type sensor or other type.

As explained above, according to the present invention, the focus detection optical system has been formed as a telecentric system. Therefore, it is possible to use a general-purpose image pick-up device as an AF area sensor. As a result, it is possible to achieve a low-cost focus detector.

Further, it is possible to use as an AF sensor a general-purpose image pick-up device or an area sensor that is mounted with an on-chip micro lens. Therefore, it is possible to increase the light-receiving quantity thereby to improve the S/N ratio and to improve the focus detection precision.

Further, according to the present invention, the beam flux of the object passed through the image pick-up lens is branched, and two images are formed on the image pick-up device, based on which a phase difference between the two images is detected. Therefore, it is not necessary to use an exclusive AF sensor. As a result, it is possible to provide an image pick-up device at low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus detector for an image pick-up lens, the focus detector comprising:
   a condenser lens disposed near a predetermined focusing surface of the image pick-up lens;
   a brightness diaphragm disposed at the rear of the condenser lens, and having a pair of apertures;
   an image re-forming optical system of a telecentric type disposed at the rear of the brightness diaphragm; and
   a photoelectric converter including photoelectric conversion elements for receiving an image formed by a beam flux passed through the image re-forming optical system.

2. A focus detector according to claim 1, wherein the photoelectric converter has a micro lens array on the light-receiving surface.

3. A focus detector according to claim 1, wherein the image re-forming optical system includes a correction optical system having a front-side focus position near the brightness diaphragm.

4. A device for detecting a focus or measuring a distance, including a detection optical system, that guides a beam flux of an image picked-up object onto at least a pair of brightness diaphragms and an image-forming lens, and forms images on light-receiving surfaces of photoelectric conversion elements disposed at the rear of the image-forming lens, wherein
   a correction lens that locates an injection pupil for receiving an incident beam onto the light-receiving surface of the photoelectric conversion elements at a substantially infinite distant position, is provided between the image-forming lens and the light-receiving surface of the photoelectric conversion elements.

5. A device according to claim 4, wherein a telecentric optical system is formed by the image-forming lens and the correction lens, and the front side focusing position of the correction lens is located near the brightness diaphragms.

6. A device according to claim 5, wherein the correction lens is constituted by a Fresnel lens.

7. A device according to claim 5, wherein the correction lens is constituted by a cylindrical lens.

8. A device according to claim 5, wherein the correction lens is constituted by a diffractive optical element.

9. A device according to claim 4, wherein the image-forming lens and the correction lens are constituted by one optical device.

10. A device according to claim 4, wherein the photoelectric conversion elements comprise micro lens arrays on their light-receiving surfaces.

11. An automatic focusing camera, comprising:
    photoelectric conversion elements;
    a detection optical system that includes a pair of brightness diaphragms and a lens disposed at positions along an image-splitting direction, for forming images of an image picked-up object on the light-receiving surfaces of the photoelectric conversion elements disposed at the rear of the lens by receiving a beam flux on this surface; and
    a controller for controlling an automatic focusing of an image based on an output signal of the photoelectric conversion elements, wherein
    the lens corrects a main beam of a beam flux incident to the light-receiving surfaces of the photoelectric conversion elements to be perpendicular to the light-receiving surface.

12. An automatic focusing camera according to claim 11, wherein the photoelectric conversion elements have focusing devices on their light-receiving surfaces.

13. An automatic focusing camera according to claim 11, wherein the lens is constituted by two optical devices provided for each brightness diaphragm.

14. An automatic focusing camera according to claim 11, wherein the lens is constituted by one optical device.

15. An automatic focusing camera according to claim 11, wherein the controller judges an image focusing state of the lens based on output signals of the photoelectric conversion elements and controls an automatic focusing based on a result of the judgment.

16. An automatic focusing camera according to claim 11, wherein the controller adds up distances to an image pick-up object based on output signals of the photoelectric conversion elements and controls an automatic focusing based on a result of the addition.

17. An automatic focusing camera according to claim 11, wherein the controller adds up output signals from a plurality of pixels from a direction perpendicular to the image-splitting direction, and controls an automatic focusing based on the addition signal.

18. An automatic focusing camera according to claim 11, wherein the controller reads by thinning output signals from a plurality of pixels from a direction perpendicular to the image-splitting direction, and controls an automatic focusing based on the read signal.

19. An automatic focusing camera according to claim 11, wherein the controller adds up output signals from a part of pixels from a direction perpendicular to the image-splitting direction, and controls an automatic focusing based on the addition signal.

20. An automatic focusing camera according to claim 11, wherein the photoelectric conversion elements have color filters for selectively transmitting red, green and blue for each pixel onto their light-receiving surfaces.

21. An automatic focusing camera according to claim 20, wherein the controller adds up output signals from pixels of the same color from a direction perpendicular to the image-splitting direction, and controls an automatic focusing based on the addition signal.

22. An automatic focusing camera according to claim 20, wherein the controller reads by thinning output signals from pixels of the same color from a direction perpendicular to the image-splitting direction, and controls an automatic focusing based on the read signal.

23. An automatic focusing camera according to claim 20, wherein the controller adds up output signals from a part of pixels of the same color from a direction perpendicular to the image-splitting direction, and controls an automatic focusing based on the addition signal.

* * * * *